United States Patent
Yamagame et al.

(10) Patent No.: US 12,220,771 B2
(45) Date of Patent: Feb. 11, 2025

(54) FLUX AND SOLDER PASTE

(71) Applicant: SENJU METAL INDUSTRY CO., LTD., Tokyo (JP)

(72) Inventors: Tomohiro Yamagame, Tokyo (JP); Shuta Akatsuka, Tokyo (JP); Sakie Okada, Tokyo (JP); Keisuke Shinozaki, Tokyo (JP); Kenta Inoue, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/560,992

(22) PCT Filed: May 27, 2022

(86) PCT No.: PCT/JP2022/021679
§ 371 (c)(1),
(2) Date: Nov. 15, 2023

(87) PCT Pub. No.: WO2022/255234
PCT Pub. Date: Dec. 8, 2022

(65) Prior Publication Data
US 2024/0261908 A1    Aug. 8, 2024

(30) Foreign Application Priority Data
May 31, 2021   (JP) ................. 2021-091197

(51) Int. Cl.
B23K 35/362   (2006.01)
B23K 35/02    (2006.01)
B23K 35/36    (2006.01)

(52) U.S. Cl.
CPC ........ B23K 35/3613 (2013.01); B23K 35/025 (2013.01); B23K 35/362 (2013.01)

(58) Field of Classification Search
CPC .................................................. B23K 35/362
See application file for complete search history.

(56) References Cited

U.S. PATENT DOCUMENTS 4,151,015 A    4/1979   Cooper

FOREIGN PATENT DOCUMENTS

| | | |
|---|---|---|
| CN | 104476017 A | 4/2015 |
| CN | 107 855 677 A | 3/2018 |
| CN | 108115309 A | 6/2018 |
| CN | 108296672 A | 7/2018 |
| CN | 110 560 962 A | 12/2019 |
| CN | 112570930 A | 3/2021 |
| JP | 03086390 | 4/1991 |
| JP | 08503168 | 4/1996 |
| JP | 2002-111190 A | 4/2002 |
| JP | 2002-361476 A | 12/2002 |
| JP | 2017-170480 A | 9/2017 |
| JP | 2017-213598 A | 12/2017 |
| JP | 6643744 B1 | 2/2020 |
| JP | 2021053653 A | 4/2021 |
| TW | 202106889 A | 2/2021 |
| WO | 9411148 A1 | 5/1994 |
| WO | WO-2015072974 A1 * | 5/2015 ......... B23K 35/3612 |

OTHER PUBLICATIONS

International Search Report for Application No. PCT/JP2022/021679 mailed Jul. 19, 2022 (4 pages).
Taiwanese Search Report for Application No. 111120085, mailed Jul. 14, 2023 (6 pages).
Chinese Notice of Allowance for App. No. 202280037846.5, dated May 16, 2024 (8 pages) [English Translation].
Supplementary European Search Report for App. No. 22815984.4, dated Sep. 25, 2024 (4 pages).
Korean Notice of Allowance (Application No. 10-2023-7040752) mailed Oct. 21, 2024.

* cited by examiner

*Primary Examiner* — Jophy S. Koshy
(74) *Attorney, Agent, or Firm* — NIXON PEABODY LLP; Jeffrey L. Costellia

(57) ABSTRACT

Provided herein is a flux which contains a rosin, a rosin amine; one or more types of organic sulfonic acid selected from the group consisting of an alkane sulfonic acid, an alkanol sulfonic acid, and an aromatic sulfonic acid, a thixotropic agent, and a solvent, wherein: the rosin content is 5-50 mass %, inclusive, of the total amount (100 mass %) of the flux, the rosin content is 5-30 mass %, inclusive, of the total amount (100 mass %) of the flux, the organic sulfonic acid content is 0.2-10 mass %, inclusive, of the total amount (100 mass %) of the flux, and the proportion (mass ratio) of the rosin amine content to the organic sulfonic acid content is 3.33-10, inclusive.

9 Claims, 2 Drawing Sheets

FLUX AND SOLDER PASTE

TECHNICAL FIELD

The present invention relates to a flux and a solder paste.

Priority is claimed on Japanese Patent Application No. 2021-091197, filed May 31, 2021, the content of which is incorporated herein by reference.

BACKGROUND ART

A flux has an effect of chemically removing metal oxides present on the metal surface of an object to be joined, which is a soldering target, and on a solder, thereby enabling the movement of metal elements at the boundary between the metal surface of the object to be joined and the solder. Therefore, by performing soldering using the flux, an intermetallic compound is formed between the metal surface of the object to be joined and the solder. Thus, strong joining can be obtained. Such a flux generally contains a resin component, a solvent, an activator, a thixotropic agent, and the like.

A solder paste is a composite material obtained by mixing a solder alloy powder and a flux. In soldering using a solder paste, the solder paste is first printed on a board, and thereafter components are mounted to heat the board on which the components are mounted in a heating furnace called a reflow furnace.

Depending on usage, an electrode of a board for mounting an electronic component may be subjected to various surface treatments such as Ni—Au plating, a Cu-Organic Solderability Preservative (Cu-OSP) treatment, and Sn plating. It is desired that the flux and the solder paste exhibit favorable wettability with respect to any of electrodes subjected to these various surface treatments.

When the flux and the solder paste contain an activator, wettability is exhibited. For example, Patent Document 1 discloses a flux containing p-toluenesulfonic acid as an activator.

CITATION LIST

Patent Document

[Patent Document 1]
Published Japanese Translation No. H08-503168 of the PCT International Publication

SUMMARY OF INVENTION

Technical Problem

However, there is a case in which the flux disclosed in Patent Document 1 does not exhibit favorable wettability among electrodes subjected to various surface treatments depending on the type of the surface treatments.

Meanwhile, in a reflow treatment, moisture contained in the flux, a gasified flux, and the like may form voids in a joint portion. The voids deteriorate the reliability of components mounted by soldering.

When electronic components are mounted on both sides of a board or an electronic component is mounted on a multilayer board, multiple times of reflow are performed. The formation of voids in a joint portion is likely to be caused by multiple times of reflow.

An object of the present invention is to provide a flux and a solder paste which can improve the wettability with respect to an electrode subjected to various surface treatments and can prevent the generation of voids even after multiple times of reflow.

Solution to Problem

The present invention includes the following aspects.

[1] A flux containing: a rosin; an amine; an organic sulfonic acid; a thixotropic agent; and a solvent.

[2] The flux according to [1], in which the organic sulfonic acid is at least one selected from the group consisting of an alkanesulfonic acid, an alkanolsulfonic acid, and an aromatic sulfonic acid.

[3] The flux according to [2], in which the organic sulfonic acid is at least one selected from the group consisting of p-toluenesulfonic acid and methanesulfonic acid.

[4] The flux according to any one of [1] to [4], in which the amine is at least one selected from the group consisting of rosin amines, azoles, and guanidines.

[5] A solder paste containing: a solder alloy powder; and the flux of any one of [1] to [4].

[6] A flux containing: a rosin; a rosin amine; at least one organic sulfonic acid selected from the group consisting of an alkanesulfonic acid, an alkanolsulfonic acid, and an aromatic sulfonic acid; a thixotropic agent; and a solvent, in which a content of the rosin is 5% by mass or more and 50% by mass or less with respect to a total amount (100% by mass) of the flux, a content of the rosin amine is 5% by mass or more and 30% by mass or less with respect to the total amount (100% by mass) of the flux, a content of the organic sulfonic acid is 0.2% by mass or more and 10% by mass or less with respect to the total amount (100% by mass) of the flux, and a ratio (mass ratio) of the content of the rosin amine to the content of the organic sulfonic acid is 3.33 or more and 10 or less.

[7] A flux containing: a rosin; an azole; at least one organic sulfonic acid selected from the group consisting of an alkanesulfonic acid, an alkanolsulfonic acid, and an aromatic sulfonic acid; a thixotropic agent; and a solvent, in which a content of the rosin is 5% by mass or more and 50% by mass or less with respect to a total amount (100% by mass) of the flux, a content of the azole is 1% by mass or more and 10% by mass or less with respect to the total amount (100% by mass) of the flux, a content of the organic sulfonic acid is 0.2% by mass or more and 10% by mass or less with respect to the total amount (100% by mass) of the flux, and a ratio (mass ratio) of the content of the azole to the content of the organic sulfonic acid is 1 or more and 3 or less.

[8] A flux containing: a rosin; a guanidine; at least one organic sulfonic acid selected from the group consisting of an alkanesulfonic acid, an alkanolsulfonic acid, and an aromatic sulfonic acid; a thixotropic agent; and a solvent, in which a content of the rosin is 5% by mass or more and 50% by mass or less with respect to a total amount (100% by mass) of the flux, a content of the guanidine is 2% by mass or more and 20% by mass or less with respect to the total amount (100% by mass) of the flux, a content of the organic sulfonic acid is 0.2% by mass or more and 10% by mass or less with respect to the total amount (100% by mass) of the flux, and a ratio (mass ratio) of the content of the guanidine to the content of the organic sulfonic acid is 1.66 or more and 5 or less.

[9] The flux according to any one of [6] to [8], in which the organic sulfonic acid is at least one selected from the group consisting of p-toluenesulfonic acid and methanesulfonic acid.

[10] A solder paste containing: a solder alloy powder; and the flux of any one of [6] to [9].

Advantageous Effects of Invention

According to the present invention, a flux and a solder paste which can improve the wettability with respect to an electrode subjected to various surface treatments and can prevent the generation of voids even after multiple times of reflow can be provided.

DESCRIPTION OF EMBODIMENTS (Flux)

Figure 1:
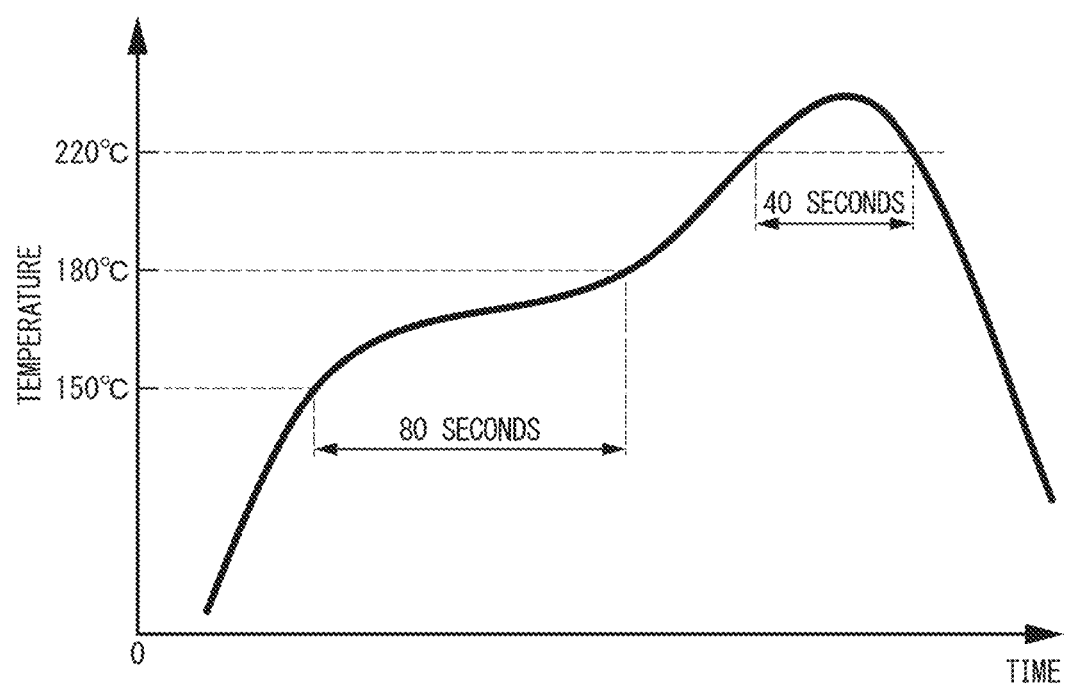
FIG. 1 is a graph showing the temperature change at the time of reflow in the evaluation of wettability and void generation in examples.

A flux of the present embodiment contains: a rosin; an amine; an organic sulfonic acid; a thixotropic agent; and a solvent.

<Rosin>

In the present invention, the term "rosin" encompasses natural resins including a mixture of abietic acid as the main component and its isomer, and resins (may be referred to as rosin derivatives) which are obtained by chemically modifying the natural resins.

The content of abietic acid in the natural resin is 40% by mass or more and 80% by mass or less, for example.

In the present specification, the term "main component" refers to a component contained in a compound in an amount of 40% by mass or more with respect to components constituting the compound.

Examples of typical isomers of abietic acid include neoabietic acid, palustric acid, and levopimaric acid. The structure of abietic acid is shown below.

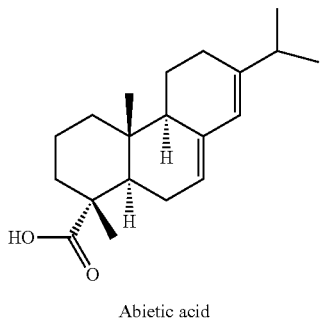

Abietic acid

Examples of the above-mentioned "natural resin" include a gum rosin, a wood rosin, and a tall oil rosin.

In the present invention, the "resins (rosin derivatives) which are obtained by chemically modifying natural resins" include those obtained by subjecting the above-mentioned "natural resin" to at least one treatment selected from the group consisting of hydrogenation, dehydrogenation, neutralization, alkylene oxide addition, amidation, dimerization, multimerization, esterification, and Diels-Alder cycloaddition.

Examples of the rosin derivatives include a purified rosin and a modified rosin.

Examples of the modified rosin include a hydrogenated rosin, a polymerized rosin, a polymerized hydrogenated rosin, a disproportionated rosin, an acid-modified rosin, a rosin ester, an acid-modified hydrogenated rosin, an acid anhydride-modified hydrogenated rosin, an acid-modified disproportionated rosin, an acid anhydride-modified disproportionated rosin, a phenol-modified rosin, an α,β unsaturated carboxylic acid-modified product (such as an acrylated rosin, a maleated rosin, and a fumarated rosin), purified products, hydrides, and disproportionated products of the polymerized rosin, purified products, hydrides, and disproportionated products of the α,β unsaturated carboxylic acid-modified product, a rosin alcohol, a hydrogenated rosin alcohol, a rosin ester, a hydrogenated rosin ester, a rosin soap, a hydrogenated rosin soap, and an acid-modified rosin soap.

In the present specification, the term "rosin" does not encompass a rosin amine.

One of the rosins may be used alone, or at least two thereof may be mixed to be used.

Among them, it is preferable to use at least one selected from the group consisting of an acid-modified hydrogenated rosin and a rosin ester, as the rosin derivative.

As the acid-modified hydrogenated rosin, it is preferable to use an acrylic acid-modified hydrogenated rosin.

The content of the rosin in the flux is preferably 5% by mass or more and 50% by mass or less, more preferably 10% by mass or more and 45% by mass or less, and even more preferably 15% by mass or more and 40% by mass or less with respect to the total amount (100% by mass) of the flux.

<Amine>

Examples of amines include rosin amines, azoles, guanidines, alkylamine compounds, and aminoalcohol compounds.

Examples of the rosin amines include dehydroabietylamine and dihydroabietylamine.

One of the rosin amines may be used alone, or at least two thereof may be mixed to be used.

The term "rosin amine" means so-called a disproportionated rosin amine.

The structures of the dehydroabietylamine and the dihydroabietylamine are each shown below.

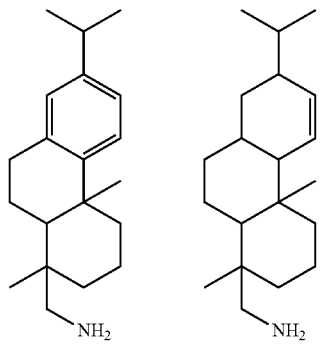

Dehydroabietylamine  Dihydroabietylamine

Examples of the azoles include 2-methylimidazole, 2-ethylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, a 2,4-diamino-6-[2'-methylimidazolyl-(1')]-ethyl-s-triazine isocyanuric acid adduct, a 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, 2-phenylimidazoline, 2,4-diamino-6-vinyl-s-triazine, a 2,4-diamino-6-vinyl-s-triazine isocyanuric acid adduct, 2,4-diamino-6-methacryloyloxyethyl-s-triazine, an epoxy-imidazole adduct, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, benzimidazole, 1,2,4-triazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2,2'-methylenebisphenol, 1,2,3-benzotriazole, 1-[N,N-bis(2-ethylhexyl)aminomethyl]benzotriazole, carboxybenzotriazole, 1-[N,N-bis(2-ethylhexyl)aminomethyl]methylbenzotriazole, 2,2'-[(methyl-1H-benzotriazol-1-yl)methyl]imino]bisethanol, 1-(1',2'-dicarboxyethyl)benzotriazole, 1-(2,3-dicarboxypropyl)benzotriazole, 1-[(2-ethylhexylamino)methyl]benzotriazole, 2,6-bis[(1H-benzotriazol-1-yl)methyl]-4-methylphenol, 5-methylbenzotriazole, and 5-phenyltetrazole.

Examples of the guanidines include 1,3-diphenylguanidine, 1,3-di-o-tolylguanidine, 1-o-tolylbiguanide, 1,3-di-o-cumenylguanidine, and 1,3-di-o-cumenyl-2-propionylguanidine.

Examples of the alkylamine compounds include ethylamine, triethylamine, ethylenediamine, triethylenetetramine, cyclohexylamine, hexadecylamine, and stearylamine.

Examples of the aminoalcohol compounds include N,N,N',N'-tetrakis(2-hydroxypropyl)ethylenediamine.

One of the amines may be used alone, or at least two thereof may be mixed to be used.

Among them, the amine preferably contains at least one selected from the group consisting of rosin amines, azoles, and guanidines, more preferably contains at least one selected from the group consisting of rosin amines and azoles, and even more preferably contains an azole.

The azoles are preferably at least one selected from the group consisting of 2-ethylimidazole and 2-phenyl-4-methylimidazole.

The guanidine is preferably ditolylguanidine.

The total content of the amine in the flux is preferably 1% by mass or more and 30% by mass or less, more preferably 2% by mass or more and 20% by mass or less, even more preferably 3% by mass or more and 15% by mass or less, and particularly preferably 3% by mass or more and 10% by mass or less with respect to the total amount (100% by mass) of the flux.

When the content of the amine is within the abovementioned range, better wettability with respect to electrodes subjected to various surface treatments can be obtained.

When the flux contains an azole, the content of the azole in the flux is preferably 1% by mass or more and 10% by mass or less, more preferably 2% by mass or more and 8% by mass or less, and even more preferably 3% by mass or more and 6% by mass or less with respect to the total amount (100% by mass) of the flux.

When the content of the azole is within the abovementioned range, better wettability with respect to electrodes subjected to various surface treatments can be obtained.

When the flux contains an azole, a ratio (mass ratio) of the content of the azole in the flux to the content of an organic sulfonic acid is preferably 0.3 or more and 10 or less, and more preferably 1 or more and 3 or less.

When the flux contains a rosin amine, the content of the rosin amine in the flux is preferably 5% by mass or more and 30% by mass or less, more preferably 7% by mass or more and 20% by mass or less, and even more preferably 10% by mass or more and 15% by mass or less with respect to the total amount (100% by mass) of the flux.

When the content of the rosin amine is within the abovementioned range, better wettability with respect to electrodes subjected to various surface treatments can be obtained.

When the flux contains a rosin amine, a ratio (mass ratio) of the content of the rosin amine in the flux to the content of an organic sulfonic acid is preferably 1 or more and 20 or less, more preferably 2 or more and 10 or less, and even more preferably 3.33 or more and 10 or less.

When the flux contains a guanidine, the content of the guanidine in the flux is preferably 2% by mass or more and 20% by mass or less, more preferably 3% by mass or more and 15% by mass or less, and even more preferably 5% by mass or more and 10% by mass or less with respect to the total amount (100% by mass) of the flux.

When the content of the guanidine is within the abovementioned range, better wettability with respect to electrodes subjected to various surface treatments can be obtained.

When the flux contains a guanidine, a ratio (mass ratio) of the content of the guanidine in the flux to the content of an organic sulfonic acid is preferably 0.5 or more and 10 or less, more preferably 1 or more and 5 or less, and even more preferably 1.66 or more and 5 or less.

<Organic Sulfonic Acid>

Examples of the organic sulfonic acids include aliphatic sulfonic acids and aromatic sulfonic acids. Examples of the aliphatic sulfonic acids include alkanesulfonic acids and alkanolsulfonic acids.

Examples of the alkanesulfonic acids include methanesulfonic acid, ethanesulfonic acid, 1-propanesulfonic acid, 2-propanesulfonic acid, 1-butanesulfonic acid, 2-butanesulfonic acid, pentanesulfonic acid, hexanesulfonic acid, decanesulfonic acid, and dodecanesulfonic acid.

Examples of the alkanolsulfonic acids include 2-hydroxyethane-1-sulfonic acid, 2-hydroxypropane-1-sulfonic acid, 2-hydroxybutane-1-sulfonic acid, 2-hydroxypentane-1-sulfonic acid, 1-hydroxypropane-2-sulfonic acid, 3-hydroxypropane-1-sulfonic acid, 4-hydroxybutane-1-sulfonic acid, 2-hydroxyhexane-1-sulfonic acid, 2-hydroxydecane-1-sulfonic acid, and 2-hydroxydodecane-1-sulfonic acid.

Examples of the aromatic sulfonic acids include 1-naphthalenesulfonic acid, 2-naphthalenesulfonic acid, p-toluenesulfonic acid, xylenesulfonic acid, p-phenolsulfonic acid, cresolsulfonic acid, sulfosalicylic acid, nitrobenzenesulfonic acid, sulfobenzoic acid, and diphenylamine-4-sulfonic acid.

One of the organic sulfonic acids may be used alone, or at least two thereof may be mixed to be used.

The organic sulfonic acid preferably includes an aromatic sulfonic acid.

The aromatic sulfonic acid is preferably p-toluenesulfonic acid.

The aliphatic sulfonic acid is preferably alkanesulfonic acid.

The alkanesulfonic acid is preferably methanesulfonic acid.

The total content of the organic sulfonic acid in the flux is preferably 0.2% by mass or more and 10% by mass or less, more preferably 0.5% by mass or more and 5% by mass or less, even more preferably 0.5% by mass or more and 3% by mass or less, and particularly preferably 1% by mass or more and 3% by mass or less with respect to the total amount (100% by mass) of the flux.

When the content of the organic sulfonic acid is equal to or more than the above-mentioned range, the wettability with respect to electrodes subjected to various surface treatments can be improved, and also, the generation of voids can be prevented even after multiple times of reflow.

<Thixotropic Agent>

Examples of the thixotropic agents include ester-based thixotropic agents, amide-based thixotropic agents, and sorbitol-based thixotropic agents.

Examples of the ester-based thixotropic agents include ester compounds, and specific examples thereof include hydrogenated castor oil and ethyl myristate.

Examples of the amide-based thixotropic agents include monoamides, bisamides, and polyamides. Specific examples thereof include: monoamides such as lauric acid amide, palmitic acid amide, stearic acid amide, behenic acid amide, hydroxystearic acid amide, saturated fatty acid amides, oleic acid amide, erucic acid amide, unsaturated fatty acid amides, 4-methylbenzamide (p-toluamide), p-toluenemethane amide, aromatic amides, hexamethylene hydroxystearic acid amide, substituted amides, methylol stearic acid amide, methylol amide, and fatty acid ester amides; bisamides such as methylene bisstearic acid amide, ethylene bislauric acid amide, ethylene bishydroxy fatty acid (in which the number of carbon atoms in the fatty acid: C6 to 24) amide, ethylene bishydroxystearic acid amide, saturated fatty acid bisamide, methylene bisoleic acid amide, unsaturated fatty acid bisamide, m-xylylene bisstearic acid amide, and aromatic bisamide; and polyamides such as saturated fatty acid polyamides, unsaturated fatty acid polyamides, aromatic polyamides, 1,2,3-propanetricarboxylic acid tris (2-methylcyclohexylamide), cyclic amide oligomers, and acyclic amide oligomers.

Examples of the cyclic amide oligomers include an amide oligomer in which a dicarboxylic acid and a diamine are cyclically polycondensed, an amide oligomer in which a tricarboxylic acid and a diamine are cyclically polycondensed, an amide oligomer in which a dicarboxylic acid and a triamine are cyclically polycondensed, an amide oligomer in which a tricarboxylic acid and a triamine are cyclically polycondensed, an amide oligomer in which a dicarboxylic acid, a tricarboxylic acid, and a diamine are cyclically polycondensed, an amide oligomer in which a dicarboxylic acid, a tricarboxylic acid, and a triamine are cyclically polycondensed, an amide oligomer in which a dicarboxylic acid, a diamine and a triamine are cyclically polycondensed, an amide oligomer in which a tricarboxylic acid, a diamine and a triamine are cyclically polycondensed, and an amide oligomer in which a dicarboxylic acid, a tricarboxylic acid, a diamine and a triamine are cyclically polycondensed.

Furthermore, examples of the acyclic amide oligomers include an amide oligomer in which a monocarboxylic acid, and a diamine and/or a triamine are acyclically polycondensed, and an amide oligomer in which a dicarboxylic acid and/or a tricarboxylic acid, and a monoamine are acyclically polycondensed. In the case of an amide oligomer containing a monocarboxylic acid or a monoamine, the monocarboxylic acid and the monoamine function as terminal molecules, thereby resulting in an acyclic amide oligomer having a reduced molecular weight. Furthermore, when the acyclic amide oligomer is an amide compound in which a dicarboxylic acid and/or a tricarboxylic acid, and a diamine and/or a triamine are acyclically polycondensed, it is an acyclic polymer-based amide polymer. Furthermore, examples of the acyclic amide oligomer include an amide oligomer in which a monocarboxylic acid and a monoamine are acyclically condensed.

Examples of the sorbitol-based thixotropic agents include dibenzylidene-D-sorbitol, bis(4-methylbenzylidene)-D-sorbitol, (D-)sorbitol, monobenzylidene(-D-)sorbitol, and mono(4-methylbenzylidene)-(D-)sorbitol.

One of the thixotropic agents may be used alone, or at least two thereof may be mixed to be used.

The thixotropic agent preferably includes an ester-based thixotropic agent.

The ester-based thixotropic agent preferably contains hydrogenated castor oil.

The content of the thixotropic agent in the flux is preferably 3% by mass or more and 20% by mass or less, more preferably 5% by mass or more and 15% by mass or less, and even more preferably 7% by mass or more and 10% by mass or less with respect to the total amount (100% by mass) of the flux.

<Solvent>

Examples of the solvents include water, alcohol solvents, glycol ether solvents, and terpineols.

Examples of the alcohol solvents include isopropyl alcohol, 1,2-butanediol, isobornyl cyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 2-methylpentane-2,4-diol, 1,1,1-tris(hydroxymethyl)propane, 2-ethyl-2-hydroxymethyl-1,3-propanediol, 2,2'-oxybis(methylene)bis(2-ethyl-1,3-propanediol), 2,2-bis(hydroxymethyl)-1,3-propanediol, 1,2,6-trihydroxyhexane, 1-ethynyl-1-cyclohexanol, 1,4-cyclohexanediol, 1,4-cyclohexanedimethanol, and 2,4,7,9-tetramethyl-5-decyne-4,7-diol Examples of the glycol ether solvents include diethylene glycol mono-2-ethylhexyl ether, ethylene glycol monophenyl ether, diethylene glycol monohexyl ether (hexyl diglycol), diethylene glycol dibutyl ether, triethylene glycol monobutyl ether, methyl propylene triglycol, butyl propylene triglycol, triethylene glycol butylmethyl ether, and tetraethylene glycol dimethyl ether.

One of the solvents may be used alone, or at least two thereof may be mixed to be used.

The solvent preferably includes a glycol ether solvent.

The glycol ether solvent preferably contains hexyl diglycol.

The total content of the solvent in the flux is preferably 40% by mass or more and 80% by mass or less, more preferably 40% by mass or more and 75% by mass or less, and even more preferably 50% by mass or more and 75% by mass or less with respect to the total amount (100% by mass) of the flux.

<Other Components>

The flux in the present embodiment may contain other components as necessary in addition to the rosin, the amine, the organic sulfonic acid, the thixotropic agent, and the solvent.

Examples of the other components include activators other than amines and organic sulfonic acids, resin components other than rosin, metal deactivators, surfactants, silane coupling agents, antioxidants, and colorants.

Examples of the activators other than amines and organic sulfonic acids include other organic acid-based activators (in other words, organic acids other than organic sulfonic acids) and halogen-based activators.

Other organic acid-based activators:

Examples of the other organic acid-based activators include carboxylic acids.

Examples of the carboxylic acids include aliphatic carboxylic acids and aromatic carboxylic acids.

Examples of the organic acid-based activators include oxalic acid, malonic acid, succinic acid, glutaric acid, adipic acid, azelaic acid, eicosanedioic acid, salicylic acid, dipicolinic acid, dibutylaniline diglycolic acid, suberic acid, sebacic acid, terephthalic acid, dodecanedioic acid, parahydroxyphenylacetic acid, picolinic acid, phenylsuccinic acid, phthalic acid, lauric acid, benzoic acid, tartaric acid, tris(2-carboxyethyl) isocyanurate, 1,3-cyclohexanedicarboxylic acid, 2,2-bis(hydroxymethyl)propionic acid, 2,2-bis(hydroxymethyl)butanoic acid, 2,3-dihydroxybenzoic acid, 2,4-diethylglutaric acid, 2-quinolinecarboxylic acid, 3-hydroxybenzoic acid, p-anisic acid, stearic acid, 12-hydroxystearic acid, oleic acid, linoleic acid, linolenic acid, myristic acid, palmitic acid, pimelic acid, caproic acid, enanthic acid, caprylic acid, pelargonic acid, isopelargonic acid, capric acid, caproleic acid, undecanoic acid, lauric acid, linderic acid, tridecanoic acid, myristoleic acid, pentadecanoic acid, isopalmitic acid, palmitoleic acid, hiragonic acid, hydnocarpic acid, margaric acid, isostearic acid, elaidic acid, petroselinic acid, moroctic acid, eleosearic acid, tariric acid, vaccenic acid, ricinoleic acid, vernolic acid, sterculic acid, nonadecanoic acid, eicosanoic acid, dimer acid, trimer acid, hydrogenated dimer acid which is a hydrogenated product obtained by adding hydrogen to dimer acid, and hydrogenated trimer acid which is a hydrogenated product obtained by adding hydrogen to trimer acid.

Examples of the dimer acid and the trimer acid include dimer acid which is a reaction product of oleic acid and linoleic acid, trimer acid which is a reaction product of oleic acid and linoleic acid, dimer acid which is a reaction product of acrylic acid, trimer acid which is a reaction product of acrylic acid, dimer acid which is a reaction product of methacrylic acid, trimer acid which is a reaction product of methacrylic acid, dimer acid which is a reaction product of acrylic acid and methacrylic acid, trimer acid which is a reaction product of acrylic acid and methacrylic acid, dimer acid which is a reaction product of oleic acid, trimer acid which is a reaction product of oleic acid, dimer acid which is a reaction product of linoleic acid, trimer acid which is a reaction product of linoleic acid, dimer acid which is a reaction product of linolenic acid, trimer acid which is a reaction product of linolenic acid, dimer acid which is a reaction product of acrylic acid and oleic acid, trimer acid which is a reaction product of acrylic acid and oleic acid, dimer acid which is a reaction product of acrylic acid and linoleic acid, trimer acid which is a reaction product of acrylic acid and linoleic acid, dimer acid which is a reaction product of acrylic acid and linolenic acid, trimer acid which is a reaction product of acrylic acid and linolenic acid, dimer acid which is a reaction product of methacrylic acid and oleic acid, trimer acid which is a reaction product of methacrylic acid and oleic acid, dimer acid which is a reaction product of methacrylic acid and linoleic acid, trimer acid which is a reaction product of methacrylic acid and linoleic acid, dimer acid which is a reaction product of methacrylic acid and linolenic acid, trimer acid which is a reaction product of methacrylic acid and linolenic acid, dimer acid which is a reaction product of oleic acid and linolenic acid, trimer acid which is a reaction product of oleic acid and linolenic acid, dimer acid which is a reaction product of linoleic acid and linolenic acid, trimer acid which is a reaction product of linoleic acid and linolenic acid, hydrogenated dimer acid which is a hydrogenated product of each of the above-mentioned dimer acids, and hydrogenated trimer acid which is a hydrogenated product of each of the above-mentioned trimer acid.

For example, a dimer acid which is a reaction product of oleic acid and linoleic acid is a dimer having 36 carbon atoms. Furthermore, a trimer acid, which is a reaction product of oleic acid and linoleic acid, is a trimer having 54 carbon atoms.

One of the other organic acid-based activators may be used alone, or at least two thereof may be mixed to be used.

The other organic acid-based activator is preferably carboxylic acid.

The carboxylic acid is preferably aliphatic carboxylic acid.

The aliphatic carboxylic acid is preferably aliphatic dicarboxylic acid.

The aliphatic dicarboxylic acid is preferably adipic acid.

The content of the other organic acid-based activator in the flux is preferably 0% by mass or more and 10% by mass or less, more preferably 0% by mass or more and 5% by mass or less, and even more preferably 0% by mass or more and 3% by mass or less with respect to the total amount (100% by mass) of the flux.

When the content of the organic acid-based activator is within the above-mentioned range, the generation of voids can be easily prevented even after multiple times of reflow.

Halogen-Based Activator:

Examples of the halogen-based activator include amine hydrohalic acid salts, and organic halogenated compounds other than amine hydrohalic acid salts.

An amine hydrohalic acid salt is a compound obtained by reacting an amine with a hydrogen halide.

Examples of amines herein include aliphatic amines, azoles, and guanidines. Examples of the hydrogen halides include hydrides of chlorine, bromine, and iodine.

Examples of the aliphatic amines include ethylamine, diethylamine, triethylamine, and ethylenediamine.

Examples of the guanidines and azoles include those described above in <Amine>.

More specific examples of the amine hydrohalic acid salts include cyclohexylamine hydrobromide, hexadecylamine hydrobromide, stearylamine hydrobromide, ethylamine hydrobromide, diphenylguanidine hydrobromide, ethylaniline hydrochloride, stearylamine hydrochloride, diethylaniline hydrochloride, diethanolamine hydrochloride, 2-ethylhexylamine hydrobromide, pyridine hydrobromide, isopropylamine hydrobromide, diethylamine hydrobromide, dimethylamine hydrobromide, dimethylamine hydrochloride, rosin amine hydrobromide, 2-ethylhexylamine hydrochloride, isopropylamine hydrochloride, cyclohexylamine hydrochloride, 2-pipecoline hydrobromide, 1,3-diphenylguanidine hydrochloride, dimethylbenzylamine hydrochloride, hydrazine hydrate hydrobromide, dimethylcyclohexylamine hydrochloride, trinonylamine hydrobromide, diethylaniline hydrobromide, 2-diethylaminoethanol hydrobromide, 2-diethylaminoethanol hydrochloride, ammonium chloride, diallylamine hydrochloride, diallylamine hydrobromide, diethylamine hydrochloride, triethylamine hydrobromide, triethylamine hydrochloride, hydrazine monohydrochloride, hydrazine dihydrochloride, hydrazine monohydrobromide, hydrazine dihydrobromide, pyridine hydrochloride, aniline hydrobromide, butylamine hydrochloride, hexylamine hydrochloride, n-octylamine hydrochloride, dodecylamine hydrochloride, dimethylcyclohexylamine hydrobromide, ethylenediamine dihydrobromide, rosin amine hydrobromide, 2-phenylimidazole hydrobromide, 4-benzylpyridine hydrobromide, L-glutamic acid hydrochloride, N-methylmorpholine hydrochloride, betaine hydrochloride, 2-pipecoline hydroiodide, cyclohexylamine hydroiodide, 1,3-diphenylguanidine hydrofluoride, diethylamine hydrofluoride, 2-ethylhexylamine hydrofluoride, cyclohexylamine hydrofluoride, ethylamine hydrofluoride, rosin amine hydrofluoride, cyclohexylamine tetrafluoroborate, and dicyclohexylamine tetrafluoroborate.

Furthermore, as the halogen-based activator, for example, a salt obtained by reacting an amine with tetrafluoroboric acid (HBF$_4$), and a complex obtained by reacting an amine with boron trifluoride (BF$_3$) can also be used.

Examples of the complex include boron trifluoride piperidine.

Examples of the organic halogenated compounds other than the amine hydrohalic acid salts include trans-2,3-dibromo-2-butene-1,4-diol, triallyl isocyanurate hexabromide, tris-(2,3-dibromopropyl) isocyanurate, 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, and 2,3-dibromo-2-butene-1,4-diol.

Furthermore, examples of the organic halogenated compounds other than the amine hydrohalic acid salts further include halogenated carboxyl compounds.

Examples thereof include carboxyl iodide compounds such as 2-iodobenzoic acid, 3-iodobenzoic acid, 2-iodopropionic acid, 5-iodosalicylic acid, and 5-iodoanthranilic acid; carboxyl chloride compounds such as 2-chlorobenzoic acid and 3-chloropropionic acid; and carboxyl bromide compounds such as 2,3-dibromopropionic acid, 2,3-dibromosuccinic acid, and 2-bromobenzoic acid.

One of the halogen-based activators may be used alone, or at least two thereof may be mixed to be used.

The halogen-based activator is preferably an amine hydrohalic acid salt.

The amine hydrohalic acid salt is preferably a compound obtained by reacting guanidine and hydrogen halide.

The compound obtained by reacting guanidine and hydrogen halide is preferably a compound obtained by reacting diphenylguanidine and hydrogen halide.

The compound obtained by reacting diphenylguanidine and hydrogen halide is preferably diphenylguanidine hydrobromide.

The content of the halogen-based activator in the flux is preferably 0% by mass or more and 5% by mass or less, more preferably 0.2% by mass or more and 3% by mass or less, and even more preferably 0.5% by mass or more and 2% by mass or less with respect to the total amount (100% by mass) of the flux.

Resin component other than rosin-based resin:

Examples of the resin components other than a rosin-based resin include a terpene resin, a modified terpene resin, a terpene phenol resin, a modified terpene phenol resin, a styrene resin, a modified styrene resin, a xylene resin, a modified xylene resin, an acrylic resin, a polyethylene resin, an acrylic-polyethylene copolymer resin, and an epoxy resin.

Examples of the modified terpene resin include an aromatic modified terpene resin, a hydrogenated terpene resin, and a hydrogenated aromatic modified terpene resin. Examples of the modified terpene phenol resin include a hydrogenated terpene phenol resin. Examples of the modified styrene resin include a styrene acrylic resin and a styrene maleic acid resin. Examples of the modified xylene resin include a phenol-modified xylene resin, an alkylphenol-modified xylene resin, a phenol-modified resol-type xylene resin, a polyol-modified xylene resin, and a polyoxyethylene-added xylene resin.

Metal Deactivator:

Examples of the metal deactivators include hindered phenolic compounds and nitrogen compounds.

The term "metal deactivator" herein refers to a compound having a capacity of preventing metal from deteriorating due to contact with a certain type of compound.

The term "hindered phenolic compound" refers to a phenolic compound having a bulky substituent (such as a branched or cyclic alkyl group such as a t-butyl group) on at least one of ortho positions of phenol.

The hindered phenolic compound is not particularly limited, and examples thereof include bis[3-(3-tert-butyl-4-hydroxy-5-methylphenyl)propionic acid][ethylenebis(oxyethylene)], N,N'-hexamethylenebis[3-(3,5-di-tert-butyl-4-hydroxyphenyl)propanamide], 1,6-hexanediol bis[3-(3,5-di-tert-butyl-4-hydroxyphenyl)propionate], 2,2'-methylenebis[6-(1-methylcyclohexyl)-p-cresol], 2,2'-methylenebis(6-tert-butyl-p-cresol), 2,2'-methylenebis(6-tert-butyl-4-ethylphenol), triethylene glycol-bis[3-(3-tert-butyl-5-methyl-4-hydroxyphenyl)propionate], 1,6-hexanediol-bis-[3-(3,5-di-tert-butyl-4-hydroxyphenyl)propionate], 2,4-bis-(n-octylthio)-6-(4-hydroxy-3,5-di-t-butylanilino)-1,3,5-triazine, pentaerythrityl-tetrakis[3-(3,5-di-tert-butyl-4-hydroxyphenyl) propionate], 2,2-thio-diethylenebis[3-(3,5-di-tert-butyl-4-hydroxyphenyl)propionate], octadecyl-3-(3,5-di-tert-butyl-4-hydroxyphenyl)propionate, N,N'-hexamethylenebis(3,5-di-t-butyl-4-hydroxy-hydrocinnamamide), 3,5-di-tert-butyl-4-hydroxybenzylphosphonate-diethyl ester, 1,3,5-trimethyl-2,4,6-tris(3,5-di-tert-butyl-4-hydroxybenzyl)benzene, N,N'-bis[2-[2-(3,5-di-tert-butyl-4-hydroxyphenyl)ethylcarbonyloxy]ethyl]oxamide, and a compound of the following formula.

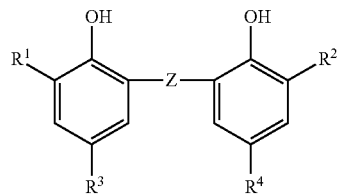

(In the formula, Z is an alkylene group which may be substituted. $R^1$ and $R^2$ are each independently an alkyl group, an aralkyl group, an aryl group, a heteroaryl group, a cycloalkyl group, or a heterocycloalkyl group, which may be substituted. $R^3$ and $R^4$ are each independently an alkyl group which may be substituted.)

Examples of the nitrogen compounds as the metal deactivator include hydrazide-based nitrogen compounds, amide-based nitrogen compounds, triazole-based nitrogen compounds, and melamine-based nitrogen compounds.

The hydrazide-based nitrogen compound may be any nitrogen compound having a hydrazide skeleton, and examples thereof include dodecanedioate bis[N2-(2-hydroxybenzoyl)hydrazide], N,N'-bis[3-(3,5-di-tert-butyl-4-hydroxyphenyl)propionyl]hydrazine, decanedicarboxylic acid disalicyloyl hydrazide, N-salicylidene-N'-salicylhydrazide, m-nitrobenzhydrazide, 3-aminophthalhydrazide, phthalic dihydrazide, adipic hydrazide, oxalobis(2-hydroxy-5-octylbenzylidene hydrazide), N'-benzoylpyrrolidonecarboxylic acid hydrazide, and N,N'-bis(3-(3,5-di-tert-butyl-4-hydroxyphenyl)propionyl)hydrazine.

The amide-based nitrogen compound may be any nitrogen compound having an amide skeleton, and examples thereof include N,N'-bis{2-[3-(3,5-di-tert-butyl-4-hydroxyphenyl)propionyloxy]ethyl}oxamide.

The triazole-based nitrogen compound may be any nitrogen compound having a triazole skeleton, and examples thereof include N-(2H-1,2,4-triazol-5-yl) salicylamide, 3-amino-1,2,4-triazole, and 3-(N-salicyloyl)amino-1,2,4-triazole.

The melamine-based nitrogen compound may be any nitrogen compound having a melamine skeleton, and examples thereof include melamine and melamine derivatives. More specifically, examples thereof include trisaminotriazine, alkylated trisaminotriazine, alkoxyalkylated trisaminotriazine, melamine, alkylated melamine, alkoxyalkylated melamine, N2-butylmelamine, N2,N2-diethylmelamine, and N,N,N',N',N'',N''-hexakis(methoxymethyl)melamine.

Surfactant:

Examples of the surfactants include nonionic surfactants and weak cationic surfactants.

Examples of the nonionic surfactants include polyethylene glycol, a polyethylene glycol-polypropylene glycol copolymer, an aliphatic alcohol polyoxyethylene adduct, an aromatic alcohol polyoxyethylene adduct, and a polyhydric alcohol polyoxyethylene adduct.

Examples of the weak cationic surfactants include diamine-terminated polyethylene glycol, a diamine-terminated polyethylene glycol-polypropylene glycol copolymer, an aliphatic amine polyoxyethylene adduct, an aromatic amine polyoxyethylene adduct, and a polyvalent amine polyoxyethylene adduct.

Examples of surfactants other than the above-mentioned surfactants include polyoxyalkylene acetylene glycols, polyoxyalkylene glyceryl ethers, polyoxyalkylene alkyl ethers, polyoxyalkylene esters, polyoxyalkylene alkylamines, and polyoxyalkylene alkylamides.

When the flux of the present embodiment contains a combination of the amine and the organic sulfonic acid in addition to the rosin, the thixotropic agent, and the solvent, sufficient wettability can be exhibited with respect to any electrode subjected to various surface treatments, and also, the generation of voids is sufficiently prevented even after multiple times of reflow.

As compared to an electrode subjected to a Ni—Au plating treatment, the surface of an electrode subjected to a Cu-OSP treatment or an electrode subjected to a Sn-plating treatment is easily oxidized, and thus are difficult to get wet. In addition, among these three types of electrodes, the surface of the electrode subjected to a Sn plating treatment is most easily oxidized, and therefore the electrode subjected to a Sn plating treatment is the least wettable.

The flux of the present embodiment also exhibits sufficient wettability with respect to any electrodes subjected to a Ni—Au plating, a Cu-OSP treatment, or a Sn plating treatment.

(Solder paste)

A solder paste of the present embodiment contains a solder alloy powder and the above-mentioned flux.

The solder alloy powder may be constituted of an Sn-only solder powder; or a powder of an Sn—Ag-based, Sn—Cu-based, Sn—Ag—Cu-based, Sn—Bi-based, or Sn—In-based solder alloy, or a powder of solder alloys in which Sb, Bi, In, Cu, Zn, As, Ag, Cd, Fe, Ni, Co, Au, Ge, P, or the like has been added to the above-mentioned alloys.

The solder alloy powder may be constituted of a powder of an Sn—Pb-based solder alloy, or a powder of a solder alloy in which Sb, Bi, In, Cu, Zn, As, Ag, Cd, Fe, Ni, Co, Au, Ge, P, or the like has been added to the Sn—Pb-based solder alloy.

The solder alloy powder is preferably a Pb-free solder.

Content of Flux:

The content of the flux in the solder paste is preferably 5% to 30% by mass and more preferably 5% to 15% by mass with respect to the total mass of the solder paste.

When the solder paste of the present embodiment contains the rosin, the amine, the organic sulfonic acid, the thixotropic agent, and the solvent, sufficient wettability can be exhibited with respect to any electrode subjected to various surface treatments, and also, the generation of voids is sufficiently prevented even after multiple times of reflow.

As compared to an electrode subjected to a Ni—Au plating treatment, the surface of an electrode subjected to a Cu-OSP treatment or an electrode subjected to a Sn-plating treatment is easily oxidized, and thus is difficult to get wet. In addition, among these three types of electrodes, the surface of the electrode subjected to a Sn plating treatment is most easily oxidized, and therefore the electrode subjected to a Sn plating treatment is the least wettable.

The solder paste of the present embodiment exhibits sufficient wettability also with respect to any electrode subjected to Ni—Au plating, a Cu-OSP treatment, or a Sn plating treatment.

EXAMPLES

Hereinafter, the present invention will be described with reference to examples, but the present invention is not limited to the following examples.

<Preparation of Flux>

Examples 1 to 11 and Comparative Examples 1 to 9

Fluxes of examples and comparative examples were blended using the constitutions shown in Tables 1 and 2 below.

Rosin: acrylic acid-modified hydrogenated rosin, rosin ester

Amine: rosin amine, 2-phenyl-4-methylimidazole, 2-ethylimidazole, 1,3-di-o-tolylguanidine (ditolylguanidine)

Organic sulfonic acids: p-toluenesulfonic acid, methanesulfonic acid

Other activators: adipic acid, diphenylguanidine hydrobromide

Thixotropic agent: hydrogenated castor oil

Solvent: hexyl diglycol

<Preparation of Solder Paste>

A flux of each example and the following solder alloy powder were mixed to blend a solder paste. In the blended solder paste, the content of the flux was 10.5% by mass, and the content of the solder alloy powder was 89.5% by mass.

The solder alloy powder in the solder paste was a powder consisting of a solder alloy composed of 3% by mass of Ag, 0.5% by mass of Cu, and the balance of Sn.

The solder alloy powder had a size (particle size distribution) satisfying symbol 6 in the powder size classification (Table 2) in JIS Z 3284-1:2014.

<Evaluation of Wettability>

Verification Method:

A Ni—Au-plated board, a Cu-OSP-treated glass epoxy board, and a Sn-plated board were prepared.

The prepared solder paste was printed on each of the boards while setting a land size to 8 mm×8 mm and a mask thickness to 80 μm.

Subsequently, the board on which the solder paste was printed was subjected to a reflow treatment.

As the reflow condition, the temperature was raised to 150° C. at 2° C./seconds, the temperature was raised from 150° ° C. to 180° C. for 80 seconds, and thereafter the temperature was raised to 180° ° C. to 240° ° C. at 2° C./seconds and maintained at 220° C. or higher for 40 seconds.

The reflow was performed in a N2 atmosphere at an oxygen concentration of 80 to 150 ppm.

FIG. 1 is a graph showing the temperature change at the time of the reflow.

The surface state of each of the boards after the reflow was evaluated according to the following evaluation criteria.

The evaluation results of Examples 1 to 11 and Comparative Examples 1 to 9 are shown in Tables 1 and 2.

Evaluation Criteria:
  A: The solder uniformly wetted the printed surface.
  B: Dewetting occurred on the outer circumferential part of the print.
  C: Dewetting occurred on the half or more of the printed surface.

Figure 2:
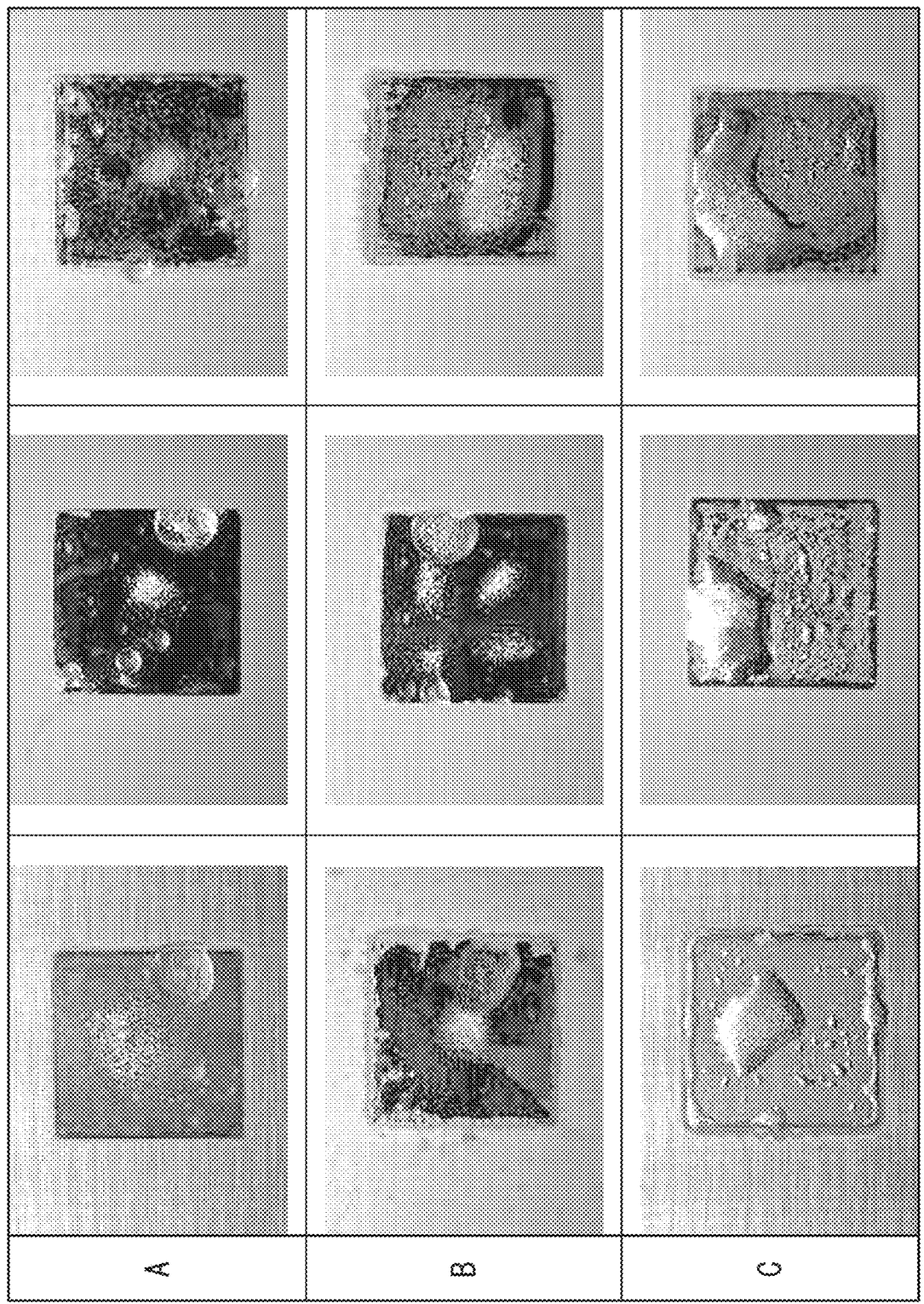
FIG. 2 shows photographs showing the wet state of a Ni—Au-plated board, a Cu-OSP-treated glass epoxy board, and a Sn-plated board after printing a solder paste on the boards, followed by performing reflow, and shows diagrams showing evaluation criteria of wetting.

FIG. 2 shows photographs showing the wet state of a Ni—Au-plated board, a Cu-OSP-treated glass epoxy board, or a Sn-plated board after printing a solder paste followed by performing reflow, and shows diagrams showing evaluation criteria of wetting. FIG. 2 shows the Ni—Au-plated board, the Cu-OSP-treated glass epoxy board, and the Sn-plated board from the left, and shows the evaluations of the wet states A, B, and C from the top.

<Evaluation of Void Generation>

Verification Method:

Using a metal mask (having an opening diameter of 0.30 mm, and a mask thickness of 80 μm), the solder paste was printed on 10 pads (having a diameter of 0.25 mm) on the board (Cu-OSP-treated glass epoxy board).

The board on which the solder paste was printed was subjected to a reflow once under the same conditions as in <Evaluation of wettability>. The void area was measured by irradiating each of the 10 pads with X-rays from the vertical direction of the board and analyzing the transmitted X-rays. In the measurement of the void area, when X-rays passed through at least one void, the measurement was made assuming that a void was present. Voids having a diameter of 5 μm or more were detected.

Subsequently, the ratio of the total area of the voids to the land area of the pad was calculated. An average value of the obtained ratios was calculated and used as an initial void area ratio.

Evaluation Criteria of Initial Void Area Ratio:
  A: The initial void area ratio was less than 10%.
  B: The initial void area ratio was 10% or more.

The evaluation results of Examples 1 to 11 and Comparative Examples 1 to 9 are shown in Tables 1 and 2.

Subsequently, each pad on which the paste having an initial void area ratio evaluated as A was printed was further subjected to a reflow twice under the same conditions. In other words, the same pad was subjected to a reflow three times in total.

Subsequently, the ratio of the total void area to the land area of each of the ten pads was calculated. An average value of the obtained ratios was calculated, and an increase rate with respect to the initial void area ratio was calculated as a void area increase rate.

Evaluation Criteria of Void Area Increase Rate:
  A: The void area increase rate was less than 5%.
  B: The void area increase rate was 5% or more.

The evaluation results of Examples 1 to 11 and Comparative Examples 3 to 5, 7, and 9 are shown in Tables 1 and 2.

TABLE 1

| | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|
| Rosin | | Acrylic acid-modified hydrogenated rosin | 10 | 10 | 10 | 10 | 10 | 10 | 10 | 10 | 10 | 10 | 10 |
| | | Rosin ester | 5 | 5 | 5 | 5 | 5 | 5 | 5 | 5 | 5 | 5 | 5 |
| Amine | | Rosin amine | 10 | 10 | 10 | 10 | | | | | | | |
| | Azole | 2-Phenyl-4-methylimidazole | | | | | | 3 | | | | | |
| | | 2-Ethylimidazole | | | | | 3 | | 3 | 3 | | | |
| | Guanidine | Ditolylguanidine | | | | | | | | | 5 | 5 | 5 |
| Organic sulfonic acid | | p-Toluenesulfonic acid | 1 | | 1 | 3 | 1 | 1 | 1 | 3 | 1 | 1 | 3 |
| | | Methanesulfonic acid | | 0.5 | | | | | | | | | |
| Other activator | Other organic acid-based activator | Adipic acid | | | | 3 | 3 | | 3 | 3 | | 3 | 3 |
| | Halogen-based activator | Diphenylguanidine hydrobromide | 0.5 | 0.5 | 0.5 | | 0.5 | 0.5 | 0.5 | 0.5 | 0.5 | 0.5 | 0.5 |

TABLE 1-continued

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Thixotropic agent | Hydrogenated castor oil | 8 | 8 | 8 | 8 | 8 | 8 | 8 | 8 | 8 | 8 | 8 |
| Solvent | Hexyl diglycol | 65.5 | 66 | 62.5 | 61 | 72.5 | 72.5 | 69.5 | 67.5 | 70.5 | 67.5 | 65.5 |
| Total (% by mass) |  | 100 | 100 | 100 | 100 | 100 | 100 | 100 | 100 | 100 | 100 | 100 |
| Evaluation | Wettability NiAu | A | A | A | A | A | A | A | A | A | A | A |
|  | Cu-OSP | A | B | A | A | A | A | A | A | B | B | B |
|  | Sn | B | B | B | B | B | B | B | B | B | B | B |
|  | Initial void area ratio | A | A | A | A | A | A | A | A | A | A | A |
|  | Void area increase rate | A | A | A | A | A | A | A | A | A | A | A |

(Ex.: Example)

TABLE 2

|  |  |  | C. Ex. 1 | C. Ex. 2 | C. Ex. 3 | C. Ex. 4 | C. Ex. 5 | C. Ex. 6 | C. Ex. 7 | C. Ex. 8 | C. Ex. 9 |
|---|---|---|---|---|---|---|---|---|---|---|---|
| Rosin |  | Acrylic acid-modified hydrogenated rosin | 10 | 10 | 10 | 10 | 10 | 10 | 10 | 10 | 10 |
|  |  | Rosin ester | 5 | 5 | 5 | 5 | 5 | 5 | 5 | 5 | 5 |
| Amine |  | Rosin amine |  | 10 | 10 | 10 |  |  |  |  |  |
|  | Azole | 2-Phenyl-4-methylimidazole |  |  |  |  |  |  |  |  |  |
|  |  | 2-Ethylimidazole |  |  |  |  |  | 3 | 3 |  |  |
|  | Guanidine | Ditolylguanidine |  |  |  |  |  |  |  | 5 | 5 |
| Organic sulfonic acid |  | p-Toluenesulfonic acid |  |  |  |  | 1 |  |  |  |  |
|  |  | Methanesulfonic acid |  |  |  |  |  |  |  |  |  |
| Other activator | Other organic acid-based activator | Adipic acid |  |  |  | 5 | 3 |  | 5 |  | 5 |
|  | Halogen-based activator | Diphenylguanidine hydrobromide | 0.5 | 0.5 | 0.5 | 0.5 | 0.5 | 0.5 | 0.5 | 0.5 | 0.5 |
| Thixotropic agent |  | Hydrogenated castor oil | 8.5 | 8 | 8 | 8 | 8 | 8 | 8 | 8 | 8 |
| Solvent |  | Hexyl diglycol | 76 | 66.5 | 61.5 | 63.5 | 75.5 | 73.5 | 68.5 | 71.5 | 66.5 |
| Total (% by mass) |  |  | 100 | 100 | 100 | 100 | 100 | 100 | 100 | 100 | 100 |
| Evaluation | Wettability | NiAu | A | A | A | A | B | A | A | A | A |
|  |  | Cu-OSP | C | B | A | A | B | A | A | C | B |
|  |  | Sn | C | C | B | C | C | B | B | C | C |
|  | Initial void area ratio |  | B | B | A | A | A | B | A | B | A |
|  | Void area increase rate |  | — | — | B | A | A | — | B | — | B |

(C. Ex.: Comparative Example)

In the flux of Example 1 containing the amine and the organic sulfonic acid, the wetting of the Ni—Au-plated board was evaluated as A, the wetting of the Cu-OSP-treated glass epoxy board was evaluated as A, the wetting of the Sn-plated board was evaluated as B, the initial void area ratio was evaluated as A, and the void area increase rate was evaluated as A.

On the other hand, in the flux of Comparative Example 1 containing neither amine nor organic sulfonic acid, the wetting of the Ni—Au-plated board was evaluated as A, the wetting of the Cu-OSP-treated glass epoxy board was evaluated as C, the wetting of the Sn-plated board was evaluated as C, and the initial void area ratio was evaluated as B.

In the flux of Example 3 containing the amine and the organic sulfonic acid, the wetting of the Ni—Au-plated board was evaluated as A, the wetting of the Cu-OSP-treated glass epoxy board was evaluated as A, the wetting of the Sn-plated board was evaluated as B, the initial void area ratio was evaluated as A, and the void area increase rate was evaluated as A.

On the other hand, in the flux of Comparative Example 4 containing no organic sulfonic acid, the wetting of the Ni—Au-plated board was evaluated as A, the wetting of the Cu-OSP-treated glass epoxy board was evaluated as A, the wetting of the Sn-plated board was evaluated as C, the initial void area ratio was evaluated as A, and the void area increase rate was evaluated as A.

In the flux of Example 5 containing the amine and the organic sulfonic acid, the wetting of the Ni—Au-plated board was evaluated as A, the wetting of the Cu-OSP-treated glass epoxy board was evaluated as A, the wetting of the Sn-plated board was evaluated as B, the initial void area ratio was evaluated as A, and the void area increase rate was evaluated as A.

On the other hand, in the flux of Comparative Example 6 containing no organic sulfonic acid, the wetting of the Ni—Au-plated board was evaluated as A, the wetting of the Cu-OSP-treated glass epoxy board was evaluated as A, the wetting of the Sn-plated board was evaluated as B, and the initial void area ratio was evaluated as B.

In the flux of Example 9 containing the amine and the organic sulfonic acid, the wetting of the Ni—Au-plated board was evaluated as A, the wetting of the Cu-OSP-treated glass epoxy board was evaluated as B, the wetting of the Sn-plated board was evaluated as B, the initial void area ratio was evaluated as A, and the void area increase rate was evaluated as A.

On the other hand, in the flux of Comparative Example 8 containing no organic sulfonic acid, the wetting of the Ni—Au-plated board was evaluated as A, the wetting of the Cu-OSP-treated glass epoxy board was evaluated as C, the wetting of the Sn-plated board was evaluated as C, and the initial void area ratio was evaluated as B.

In the flux of Example 1 containing the amine and the organic sulfonic acid, the wetting of the Ni—Au-plated board was evaluated as A, the wetting of the Cu-OSP-treated glass epoxy board was evaluated as A, the wetting of the Sn-plated board was evaluated as B, the initial void area ratio was evaluated as A, and the void area increase rate was evaluated as A.

On the other hand, in the flux of Comparative Example 5 containing no amine, the wetting of the Ni—Au-plated board was evaluated as B, the wetting of the Cu-OSP-treated glass epoxy board was evaluated as B, the wetting of the Sn-plated board was evaluated as C, the initial void area ratio was evaluated as A, and the void area increase rate was evaluated as A.

In the flux of Comparative Example 2 containing no organic acid, the wetting of the Sn-plated board was evaluated as C, and the initial void area ratio was evaluated as B.

In the flux of Comparative Example 4 in which the content of adipic acid was 3% by mass and no organic sulfonic acid was contained, the wetting of the Sn-plated board was evaluated as C, the initial void area ratio was evaluated as A, and the void area increase rate was evaluated as A.

Furthermore, in the flux of Comparative Example 3 in which the content of adipic acid was 5% by mass and no organic sulfonic acid was contained, the wetting of the Sn-plated board was evaluated as B, the initial void area ratio was evaluated as A, and the void area increase rate was evaluated as B.

Furthermore, in the flux of Comparative Examples 7 and 9 in which the content of adipic acid was 5% by mass and no organic sulfonic acid was contained, the initial void area ratio was evaluated as A, and the void area increase rate was evaluated as B.

On the other hand, in the flux of Examples 1 to 11 containing the amine and the organic sulfonic acid, the wetting of the Ni—Au-plated board was evaluated as A, the wetting of the Cu-OSP-treated glass epoxy board was evaluated as A or B, the wetting of the Sn-plated board was evaluated as B, the initial void area ratio was evaluated as A, and the void area increase rate was evaluated as A.

Since the flux and the solder paste of Examples 1 to 11 of the present invention contained the amine and the organic sulfonic acid, sufficient wetting was realized with respect to the Ni—Au-plated board, the Cu-OSP-treated glass epoxy board, and the Sn-plated board, and also, the initial void area ratio and the void area increase rate could be sufficiently reduced.

In the fluxes of Example 1 and Examples 3 to 8 of the present invention in which a rosin amine or imidazole was contained and the content of the organic sulfonic acid was 1% by mass or more with respect to the total amount of the flux, excellent wetting was realized with respect to any board of the Ni—Au-plated board, the Cu-OSP-treated glass epoxy board, and the Sn-plated board.

INDUSTRIAL APPLICABILITY

According to the present invention, the flux and the solder paste which can improve the wettability with respect to an electrode subjected to various surface treatments and can prevent the generation of voids even after multiple times of reflow can be provided. The solder paste and the flux can be suitably used to conduct soldering accompanying multiple times of reflow.

The invention claimed is:

1. A flux comprising: a rosin; a rosin amine; p-toluenesulfonic acid; a thixotropic agent; and a solvent,
    wherein a content of the rosin is 5% by mass or more and 50% by mass or less with respect to a total amount (100% by mass) of the flux,
    a content of the rosin amine is 5% by mass or more and 30% by mass or less with respect to the total amount (100% by mass) of the flux,
    a content of the p-toluenesulfonic acid acid is 0.2% by mass or more and 10% by mass or less with respect to the total amount (100% by mass) of the flux,
    a ratio (mass ratio) of the content of the rosin amine to the content of the p-toluenesulfonic acid is 3.33 or more and 10 or less.

2. A flux comprising: a rosin; one or more azole selected from the group consisting of 2-ethylimidazole and 2-phenyl-4-methylimidazole; p-toluenesulfonic acid; a thixotropic agent; and a solvent,
    wherein a content of the rosin is 5% by mass or more and 50% by mass or less with respect to a total amount (100% by mass) of the flux,
    a content of the azole is 1% by mass or more and 10% by mass or less with respect to the total amount (100% by mass) of the flux,
    a content of the p-toluenesulfonic acid acid is 0.2% by mass or more and 10% by mass or less with respect to the total amount (100% by mass) of the flux,
    a ratio (mass ratio) of the content of the azole to the content of the p-toluenesulfonic acid acid is 1 or more and 3 or less.

3. A flux comprising: a rosin; ditolylguanidine; p-toluenesulfonic acid; a thixotropic agent; and a solvent,
    wherein a content of the rosin is 5% by mass or more and 50% by mass or less with respect to a total amount (100% by mass) of the flux,
    a content of the ditolylguanidine is 2% by mass or more and 20% by mass or less with respect to the total amount (100% by mass) of the flux,
    a content of the p-toluenesulfonic acid acid is 0.2% by mass or more and 10% by mass or less with respect to the total amount (100% by mass) of the flux,
    a ratio (mass ratio) of the content of the ditolylguanidine to the content of the p-toluenesulfonic acid acid is 1.66 or more and 5 or less.

4. A solder paste comprising: a solder alloy powder; and the flux of claim 1.

5. The flux according to claim 1, wherein a total content of the solvent in the flux is 40% by mass or more and 80% by mass or less with respect to the total amount (100% by mass) of the flux.

6. A solder paste comprising: a solder alloy powder; and the flux of claim 2.

7. The flux according to claim 2, wherein a total content of the solvent in the flux is 40% by mass or more and 80% by mass or less with respect to the total amount (100% by mass) of the flux.

8. A solder paste comprising: a solder alloy powder; and the flux of claim 3.

9. The flux according to claim 3, wherein a total content of the solvent in the flux is 40% by mass or more and 80% by mass or less with respect to the total amount (100% by mass) of the flux.

* * * * *